US010911739B2

(12) United States Patent
Matsuo et al.

(10) Patent No.: US 10,911,739 B2
(45) Date of Patent: Feb. 2, 2021

(54) CAMERA DEVICE (71) Applicant: HITACHI AUTOMOTIVE SYSTEMS, LTD., Hitachinaka (JP)

(72) Inventors: Shigeru Matsuo, Tokyo (JP); Manabu Sasamoto, Tokyo (JP); Atsushi Ichige, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/335,760

(22) PCT Filed: Oct. 13, 2017

(86) PCT No.: PCT/JP2017/037122
§ 371 (c)(1),
(2) Date: Mar. 22, 2019

(87) PCT Pub. No.: WO2018/074340
PCT Pub. Date: Apr. 26, 2018

(65) Prior Publication Data
US 2019/0253694 A1    Aug. 15, 2019

(30) Foreign Application Priority Data
Oct. 20, 2016    (JP) .................................. 2016-206052

(51) Int. Cl.
*H04N 13/239*    (2018.01)
*H04N 19/423*    (2014.01)
(Continued)

(52) U.S. Cl.
CPC .......... *H04N 13/239* (2018.05); *G06F 12/00* (2013.01); *G06F 13/16* (2013.01); *G06T 1/20* (2013.01);
(Continued)

(58) Field of Classification Search
CPC .. H04N 13/239; H04N 5/225; H04N 5/23232; H04N 5/217; H04N 13/225;
(Continued)

(56) References Cited

U.S. PATENT DOCUMENTS 5,483,642 A    6/1996 Okazawa
2006/0114330 A1*  6/2006 Kuroiwa .................. G06T 1/20
    348/207.99
(Continued)

FOREIGN PATENT DOCUMENTS

JP    4-227557 A    8/1992
JP    2007-72867 A    3/2007
(Continued)

OTHER PUBLICATIONS

Extended European Search Report issued in corresponding European Application No. 17863146.1 dated Apr. 30, 2020.
(Continued)

*Primary Examiner* — Thai Q Tran
*Assistant Examiner* — Syed Y Hasan
(74) *Attorney, Agent, or Firm* — Foley & Lardner LLP (57) ABSTRACT The present invention provides a camera device capable of quickly processing image data while suppressing bus traffic. In the present invention, an image memory 50 is connected to a memory bus 70 and stores a right source image 220 and a left source image 210. A memory access management 40 is connected to the memory bus 70 and to an internal bus 80, reads the right source image 220 and the left source image 210 from the image memory 50 via the memory bus 70, and outputs the read right source image 220 and the left source image 210 to the internal bus 80. Processing unit A 30, processing unit B 31, and processing unit C 32 are connected to the internal bus 80 and process the image data output to the internal bus 80.

6 Claims, 10 Drawing Sheets (51) Int. Cl.
- *G06T 7/73* (2017.01)
- *H04N 13/225* (2018.01)
- *G06T 7/593* (2017.01)
- *H04N 5/232* (2006.01)
- *G06F 13/16* (2006.01)
- *G06F 12/00* (2006.01)
- *H04N 5/225* (2006.01)
- *G06T 1/20* (2006.01)

(52) U.S. Cl.
CPC ............... *G06T 7/593* (2017.01); *G06T 7/73* (2017.01); *H04N 5/225* (2013.01); *H04N 5/232* (2013.01); *H04N 13/225* (2018.05); *H04N 19/423* (2014.11); *B60R 2300/105* (2013.01); *B60R 2300/107* (2013.01); *B60R 2300/303* (2013.01); *B60R 2300/8093* (2013.01)

(58) Field of Classification Search
CPC ......... H04N 19/423; G06T 7/73; G06T 7/593; G06K 9/40
USPC ............... 348/207.99, 222.1, 241; 382/275
See application file for complete search history.

(56) References Cited

U.S. PATENT DOCUMENTS

| | | | |
|---|---|---|---|
| 2010/0260428 A1 | 10/2010 | Ueno | |
| 2010/0321538 A1* | 12/2010 | Nakazono | H04N 5/3572 348/241 |
| 2011/0141308 A1* | 6/2011 | Taoka | H04N 5/3572 348/222.1 |
| 2011/0242342 A1 | 10/2011 | Goma et al. | |

FOREIGN PATENT DOCUMENTS

| | | |
|---|---|---|
| JP | 2010-245961 A | 10/2010 |
| JP | 2012-18014 A | 1/2012 |
| JP | 2013-190899 A | 9/2013 |

OTHER PUBLICATIONS

International Search Report with English translation and Written Opinion issued in corresponding application No. PCT/JP2017/037122, dated Dec. 26, 2017.

* cited by examiner

| REGION | PRIORITY |
|---|---|
| REGION 1 | 3 |
| REGION 2 | 1 |
| REGION 3 | 2 |
| REGION 4 | 4 |
| ... | ... |

CAMERA DEVICE

TECHNICAL FIELD

The present invention relates to a camera device.

BACKGROUND ART

In order to improve running safety of a vehicle, a system for detecting an obstacle in front of the vehicle by a camera mounted on the vehicle and giving a driver an alarm or performing an automatic brake when there is a possibility that the vehicle may collide with the obstacle has been studied.

Sensors for monitoring the front of the vehicle include millimeter-wave radar, laser radar, a camera, and the like. As a type of the camera, there are a monocular camera and a stereo camera using a plurality of cameras. The stereo camera can measure a distance to a photographed object by using a parallax of an overlapping region photographed with two cameras at a predetermined interval. Therefore, the stereo camera can accurately detect the risk of collision to the front object.

The stereo camera obtains a parallax of images photographed by two cameras, and converts the parallax into a distance. In order to obtain the parallax, it is necessary to perform matching determination of images between the two cameras. Since the matching process has a large amount of calculation, a method of processing by hardware has been devised. However, in the future, it is expected that the number of photographed pixels of the camera is increased and a frame rate is further increased, and additional high-speed processing of the parallax calculation is required.

Therefore, there has been proposed a method of realizing the high-speed processing by performing geometric correction processing, texture detection processing, parallax calculation processing, and the like for each small region in parallel (for example, see PTL 1).

In addition, there has been proposed a method of performing parallel image processing for each region of an image memory having a plurality of processing modules and divided into a plurality of regions (for example, see PTL 2).

CITATION LIST

Patent Literature

PTL 1: JP 2012-18014 A
PTL 2: JP 2007-72867 A

SUMMARY OF INVENTION

Technical Problem

In PTL 1, the calculations necessary for calculating the parallax of the stereo camera are divided into detailed steps, and these calculations are pipelined to realize high-speed processing. According to the method, the calculations to be processed in parallel are speeded up, and the amount of image data required for the calculations is also increased. Therefore, if the number of pipeline processing stages is increased for additional high-speed processing, there is a problem that a bus traffic of a memory is increased, which hinders the improvement of the processing speed.

In PTL 2, a plurality of function modules having the same calculation function are prepared and are operated in parallel to realize high-speed processing. According to the method, it is possible to speed up the calculation according to the number of functional modules. However, there is a problem that as the number of functional modules increases, the bus traffic in a main memory increases, which hinders high-speed processing.

An object of the present invention is to provide a camera device capable of processing image data at a high speed while suppressing a bus traffic.

Solution to Problem

In order to achieve the object, a camera device according to the present invention includes: a first bus; a first memory connected to the first bus to store image data; a second bus; a memory access management unit connected to the first bus and the second bus to read the image data from the first memory via the first bus and to output the read image data to the second bus; and a plurality of processing units connected to the second bus to process the image data output to the second bus.

Advantageous Effects of Invention

According to the present invention, the image data can be processed at a high speed while suppressing the bus traffic. Other problems, structures, and effects are apparent from the description of the embodiments below.

DESCRIPTION OF EMBODIMENTS

A configuration and an operation of a stereo camera device (camera device) according to first and second embodiments of the present invention are hereinafter described with reference to the drawings. The stereo camera device is, for example, an on-board stereo camera device used for recognition of an obstacle outside a vehicle. In addition, in the drawings, the same reference numerals denote the same parts.

First Embodiment

Figure 1:
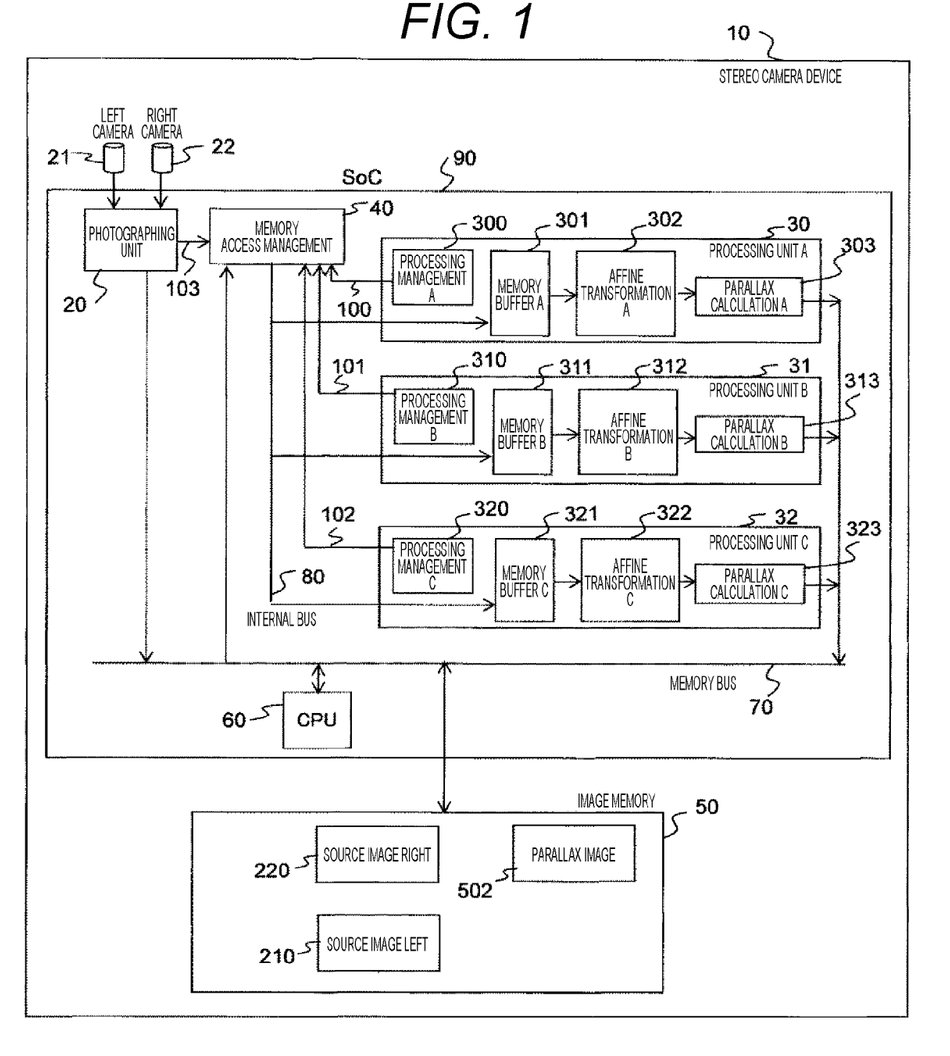
FIG. 1 is a functional block diagram of a stereo camera device.

FIG. 1 illustrates a block diagram of a stereo camera device 10. The stereo camera device 10 has two cameras of a left camera 21 and a right camera 22 as a photographing unit 20. The photographing unit 20 performs luminance correction or noise removal for images photographed by the left camera 21 and the right camera 22, and then writes the images to regions of a source image right 220 and a source image left 210 in an image memory 50 via a memory bus 70. The source image right 220 and the source image left 210 written in this way are transmitted to an internal bus 80 by a memory access management 40.

In other words, the image memory 50 (a first memory) is connected to the memory bus 70 (a first bus) to store the source image right 220 and the source image left 210 (image data). The memory access management 40 (memory access management unit) is connected to the memory bus 70 and the internal bus 80 (a second bus) for reading the source image right 220 and the source image left 210 from the image memory 50, respectively, via the memory bus 70 and outputting the read source image right 220 and source image left 210 to the internal bus 80.

Since the memory access management 40 reads the image data from the image memory 50 instead of a processing unit A 30, a processing unit B 31, and a processing unit C 32 (a plurality of processing units), a traffic of the memory bus 70 is suppressed when there are the plurality of processing units that perform processing on the image data of any region. In addition, since the memory access management 40 outputs the image data to the internal bus 80, the plurality of processing units can appropriately perform parallel processing. Accordingly, the image data can be processed at a high speed.

The memory access management 40 detects the amount of the image written to the image memory 50 by the photographing unit 20 by a control signal 103 and controls an access timing of the image memory 50. In addition, the memory access management 40 detects an execution state of each processing unit by control signals 100, 101, and 102, and determines whether each processing unit is ready to receive the image data.

In other words, processing management A 300, B 310, and C 320 as the processing management units detect the execution state of the processing of the processing unit A 30, the processing unit B 31, and the processing unit C 32, respectively. The memory access management 40 (memory access management unit) acquires the execution state of the processing of the processing unit A 30, the processing unit B 31, and the processing unit C 32 via the control signals 100, 101, and 102, and determines whether or not the processing unit A 30, the processing unit B 31, and the processing unit C 32 can receive the image data from the acquired execution state. Accordingly, when the processing unit of processing the image data can receive the image data, the memory access management 40 may distribute the image data.

The processing unit A 30 receives data of the source image right 220 and the source image left 210 from the internal bus 80 and stores the data in a memory buffer A 301. After an affine transformation processing is performed on the stored image data in the affine transformation A 302 to perform distortion correction, a parallax of the left and right images is calculated in a parallax calculation A 303 to calculate parallax data. The calculated parallax data is written in a region of a parallax image 502 of the image memory 50.

In other words, the memory buffer A 301 stores the image data output to the internal bus 80 (the second bus). The affine transformation A 302 (affine transformation unit) affine-transforms the image data stored in the memory buffer A 301. The parallax calculation A 303 (parallax calculation unit) calculates the parallax from the image data which is affine-transformed by the affine transformation A 302.

The processing management A 300 performs a control for collect the image data of the internal bus 80 in the memory buffer A 301. The processing unit B 31 and the processing unit C 32 have the same function as the processing unit A 30, and these processing units perform a parallel processing, thereby realizing high-speed image processing.

In other words, the processing unit A 30, the processing unit B 31, and the processing unit C 32 (a plurality of processing units) are connected to the internal bus 80 (the second bus) to process the image data output to the internal bus 80.

In addition, a CPU 60 performs processing such as detection of an obstacle by using the parallax image 502 while controlling the stereo camera device 10.

In addition, in the stereo camera device 10, it is assumed that the CPU 60, the photographing unit 20, the memory access management 40, the processing unit A 30, the processing unit B 31, the processing unit C 31, and the internal bus 80 are mounted on the same system on a chip (SoC) 90. Each processing unit of the SoC 90 accesses the image memory via the memory bus 70. Therefore, in order to speed-up the system, it is necessary to reduce bus traffic of the memory bus 70.

Figure 2:
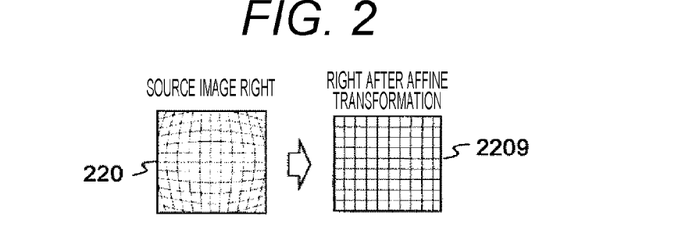
FIG. 2 is an explanation diagram of an affine transformation processing.

FIG. 2 illustrates an outline of processing of the affine transformation A 302. The images photographed by the left camera 21 and the right camera 22 are distorted by a lens and are written in the source image right 220 and the source image left 210 with the distortion. An image of the source image right 220 in FIG. 2 illustrates an example of distortion when a rectangular pattern is photographed. When the image is affine-transformed by the affine transformation A 302, the image is transformed into a correct rectangular pattern like an image of a right after affine transformation 2209. This processing is similarly performed for the source image left 210. In addition, an affine transformation B 312 and an affine transformation C 322 have the same function.

Figure 3:
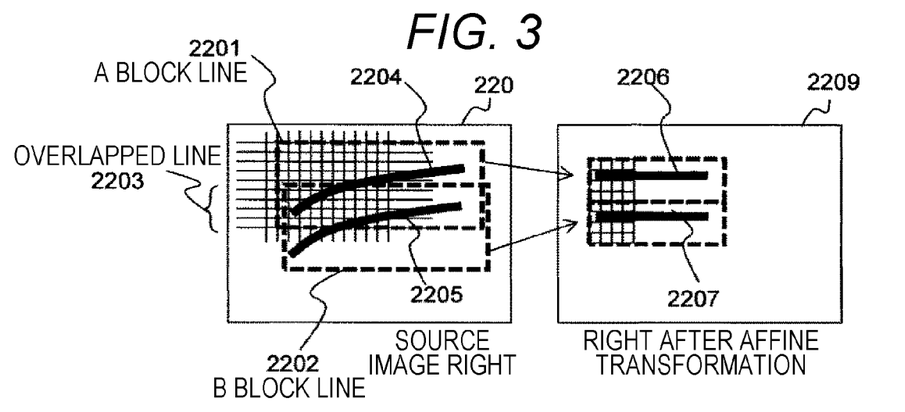
FIG. 3 is a diagram illustrating duplicate accesses of an image memory by the affine transformation processing.

FIG. 3 illustrates an example of a memory access when the affine transformation A 302 performs transformation processing. In an example in which a curve 2204 in the source image right 220 is transformed into a straight line 2206 of the right after affine transformation 2209, image data of a region of an A block line 2201 is read, and affine transformation processing of the entire region is performed. In addition, when a curve 2205 is transformed into a straight line 2207, a region of a B block line 2202 is read and processing is performed. In this case, the A block line 2201 and the B block line 2202 have overlapping regions indicated by an overlapped line 2203.

In other words, the processing unit A 30 and the processing unit B 31 (a plurality of processing units) process image data of different regions. Each region has a portion overlapping another region.

For example, when the processing unit A 30 processes the A block line 2201 and the processing unit B 31 processes the B block line 2202 in a shared manner, the image data of the overlapped line 2203 are read by both the processing unit A 30 and the processing unit B 31. Therefore, when the processing unit A 30 and the processing unit B 31 independently access the image memory 50, the bus traffic of the memory bus 70 is increased by the overlapped line 2203.

Therefore, in the present embodiment, the memory access management 40 accesses the image memory 50 instead of each processing unit and distributes the accessed data to each processing unit, thereby preventing the traffic of the memory bus 70 from being increased.

Figure 4:
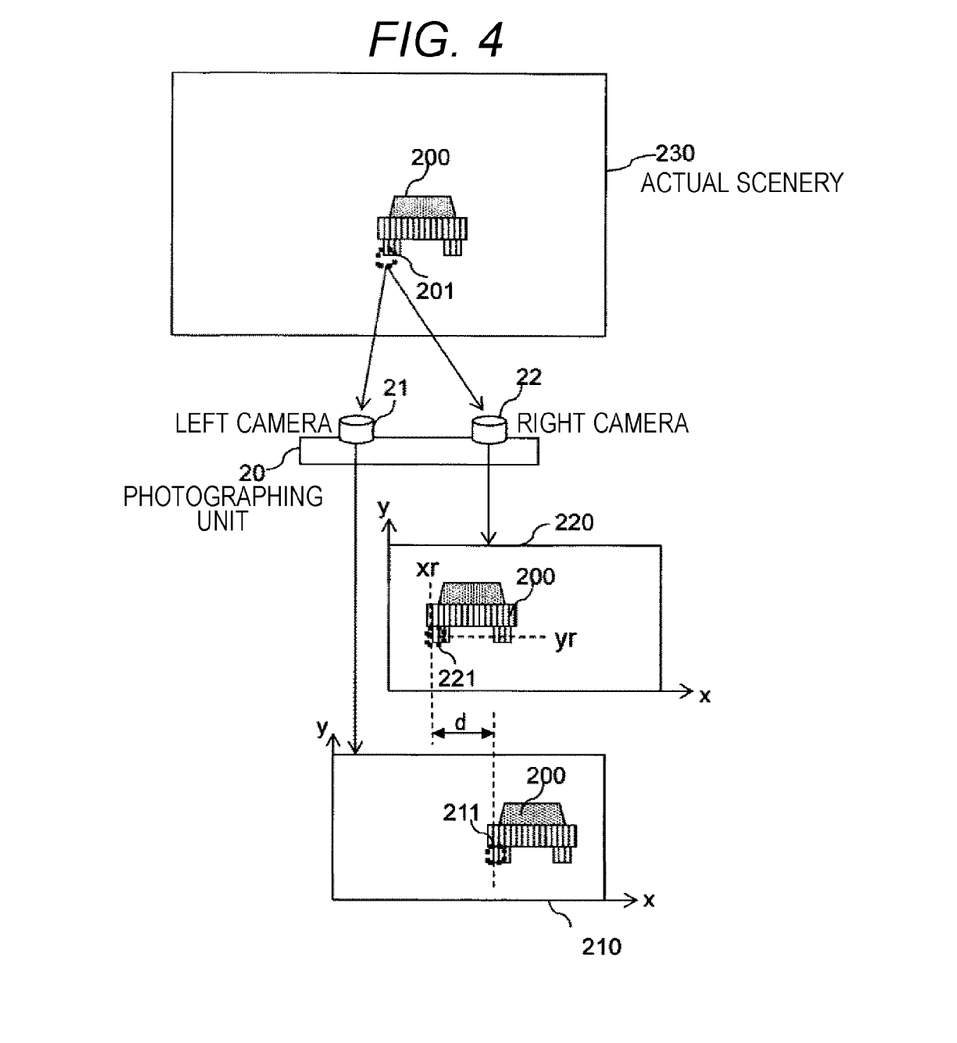
FIG. 4 is an explanation diagram of a parallax calculation.

FIG. 4 illustrates parallax calculation processing of the parallax calculation A 303. The image photographed by the right camera 22 is used as a criteria image, and a criteria block image 221 such as 8 pixels×8 pixels, for example, is defined. A size of the block image is not limited to this example. On the other hand, in the image photographed by the left camera 21, a reference image with a search width (for example, 128 pixels) is selected based on the same vertical position (Y coordinate) and horizontal position (X coordinate) as the criteria block image 221. Thereafter, a difference between the criteria block image 221 and the reference image is calculated. This difference calculation is called SAD and performs the following calculation.

[Equation 1]

$$SAD = \Sigma\Sigma |I(i,j) - T(i,j)| \quad (1)$$

where I is an 8×8 image block in the reference image, T is image data of the criteria block image 221, and i and j are coordinates in the image block. In order to calculate one parallax, a reference position of the reference image is shifted one by one and a calculation is performed by the search width to search for a position where an SAD value becomes the smallest.

In an actual scenery 230 seen from a front window of the vehicle illustrated in FIG. 4, there is a front vehicle 200. When there are the source image right 220 photographed by the right camera 22 and the source image left 210 photographed by the left camera 21, a part 201 of the front vehicle 200 is photographed at a position of the criteria block image 221 in the source image right 220 and is photographed at a position of the reference block image 211 in the source image left 210.

As a result, a parallax d occurs in the position of the criteria block image 221 and the reference block image 211. This parallax d becomes a large value when the front vehicle 200 is close to the stereo camera device 10, and becomes a small value when the front vehicle 200 is far from the stereo camera device 10. The parallax obtained in this way is obtained in the whole image. By using the parallax d, a distance from the front vehicle 200 (a subject) to the stereo camera device 10 can be measured by a principle of triangulation. The distance Z from the parallax d is obtained by the following equation.

[Equation 2]

$$Z = (f \times B)/d \quad (2)$$

where f is a focal distance of the right and left cameras, and B is a distance between the right camera 22 and the left camera 21 (baseline length). In addition, in order to transform the parallax data into three dimensions, distances in the X and Y directions on the three dimensions of the point where Z is obtained are expressed by the following equations.

[Equation 3]

$$X = (Z \times xr)/f \quad (3)$$

[Equation 4]

$$Y = (Z \times Yr)/f \quad (4)$$

where xr is an x coordinate on the source image right 220 and yr is a y coordinate on the source image right 220. As described above, the position (X, Y, Z) on a three-dimensional space of the subject can be obtained as the distance Z from the stereo camera device 10 by the images photographed by the stereo camera device 10.

Figure 5:
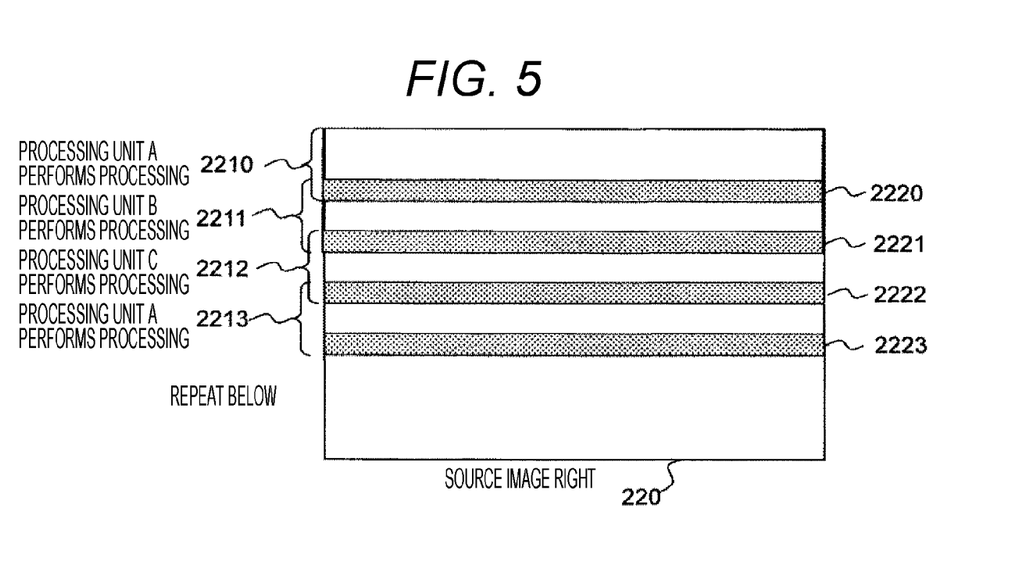
FIG. 5 is a diagram for describing a classification of the image memory and a division of a processing unit.

FIG. 5 describes a source image of the image memory 50 and a sharing of each processing unit. The source image right 220 is divided in a horizontal direction in a block line unit. The processing unit A 30 performs processing of a block line 2210, the processing unit B 31 performs processing of a block line 2211, and the processing unit C 32 performs processing of a block line 2212. The processing unit A 30 takes charge of the block line 2213, and the processing is sequentially performed from the processing unit A 30 to the processing unit C 32 for each block line. In addition, an overlapped line 2220 is a region necessary for both the processing unit A 30 and the processing unit B 31, and an overlapped region 2221 is a region necessary for both the processing unit B 31 and the processing unit C 32. The source image left 210 is also divided in the same way.

Figure 6:
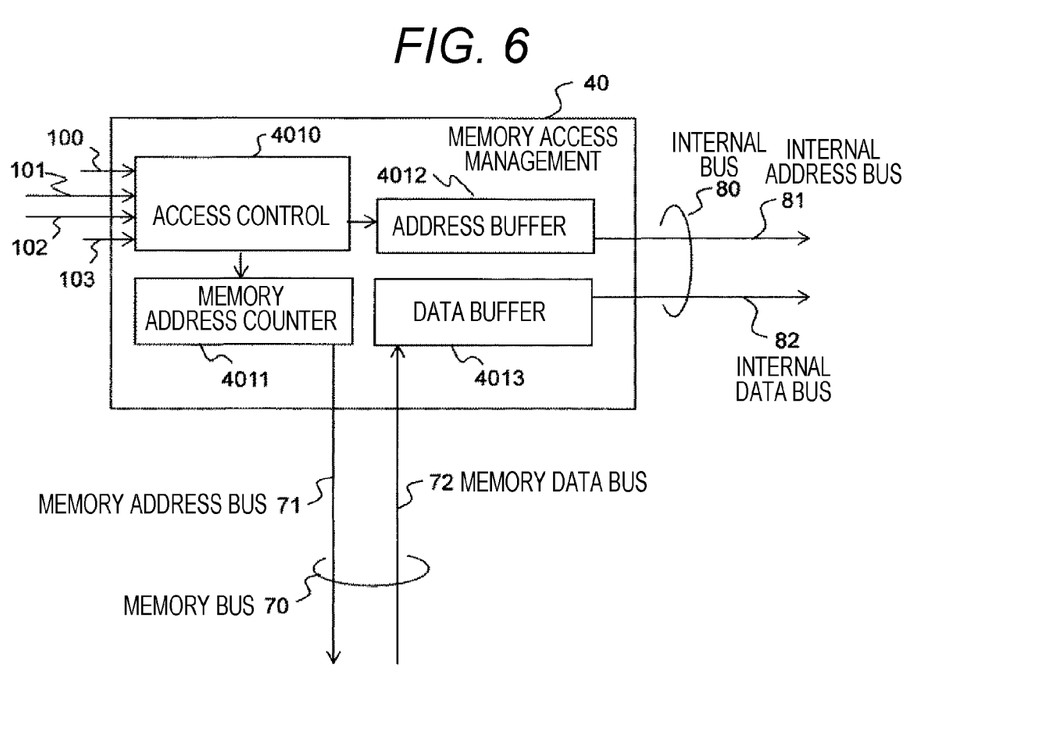
FIG. 6 is a block diagram of a memory access management.

FIG. 6 illustrates a configuration of a memory access management A 40. The memory bus 70 used when the memory access management A 40 reads the image data from the image memory 50 is constituted by a memory address bus 71 and a memory data bus 72. An access control 4010 detects that an image of one raster (one line) or more is written in the source image right 220 and the source image left 210 of the image memory 50 by the control signal 103, and outputs an address of the source image right 220 of the image memory 50 to the memory address bus 71, and the image memory 50 outputs data indicated by the address to the memory data bus 72. The output data is collected (stored) in a data buffer 4013.

Thereafter, it is confirmed that each processing unit can receive data by the control signals 100, 101, and 102, and an address of the data read from the image memory 50 is input to the address buffer 4012 and is output to the internal address bus 81 of the internal bus 80. In addition, data of a data buffer 4013 is output to an internal data bus 82. When the access to data by one raster of the source image right 220 is terminated, an access to data by one raster of the source image left 210 is performed. Thereafter, the source image right 220 and the source image left 210 are alternately accessed.

In other words, the memory access management A 40 (memory access management unit) reads the image data line by line and outputs the read image data to the internal bus 80 (second bus) line by line. Accordingly, each of the plurality of processing units can appropriately receive the one line of image data output to the internal bus 80.

Figure 7:
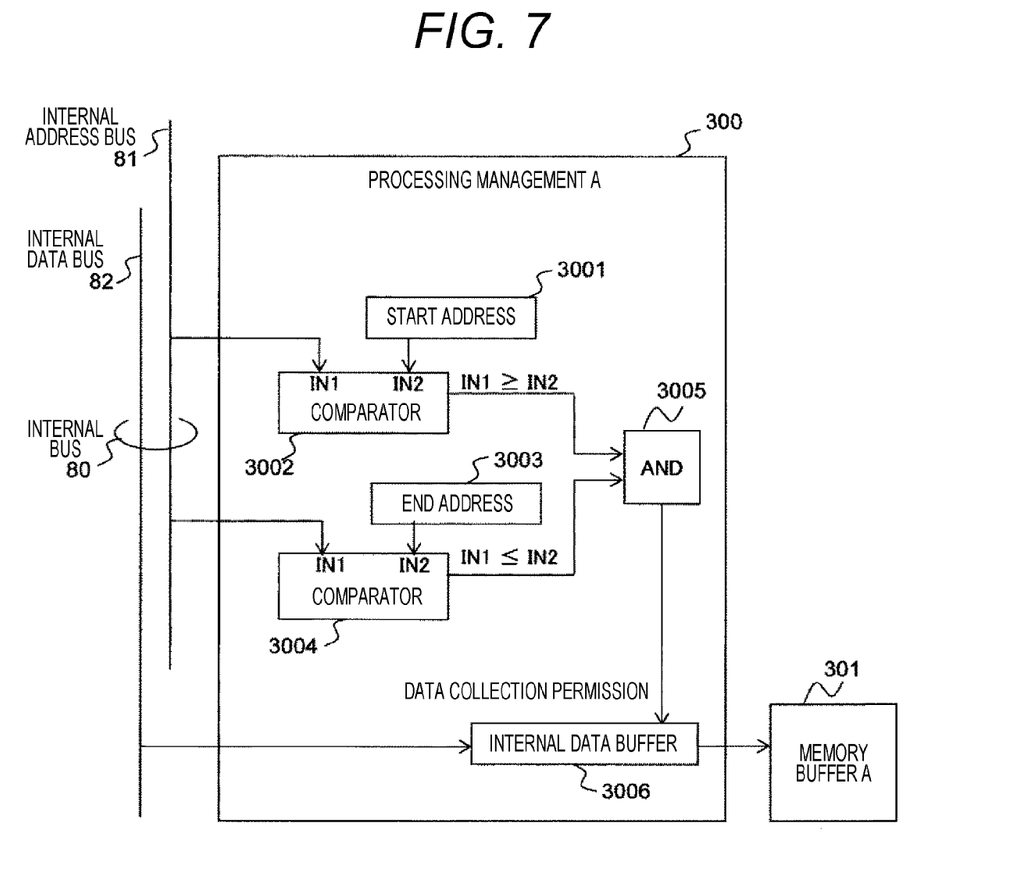
FIG. 7 is a block diagram of a processing management.

FIG. 7 illustrates a configuration of the processing management A 300 of the processing unit A 30. The internal address bus 81 of the internal bus 80 is connected to a comparator 3002 and a comparator 3004. The comparator 3002 compares a magnitude relation with a start address 3001. The start address 3001 indicates a start address of a data region to be processed by the processing unit A 30, and the comparator 3002 determines that the internal address bus 81 indicates an address of the start address 3001 or more.

An end address 3003 indicates an end address of a data region to be processed by the processing unit A 30, and the comparator 3004 determines that the internal address bus 81 indicates an address of the end address 3003 or less. These determination results are sent to an AND (logical AND) 3005, where data of the internal data bus 82 is collected in the internal data buffer 3006 only when both are established. The start address 3001 and the end address 3003 may have a plurality of sets. The processing management B 310 and the processing management C 320 also perform the same processing.

Figure 8:
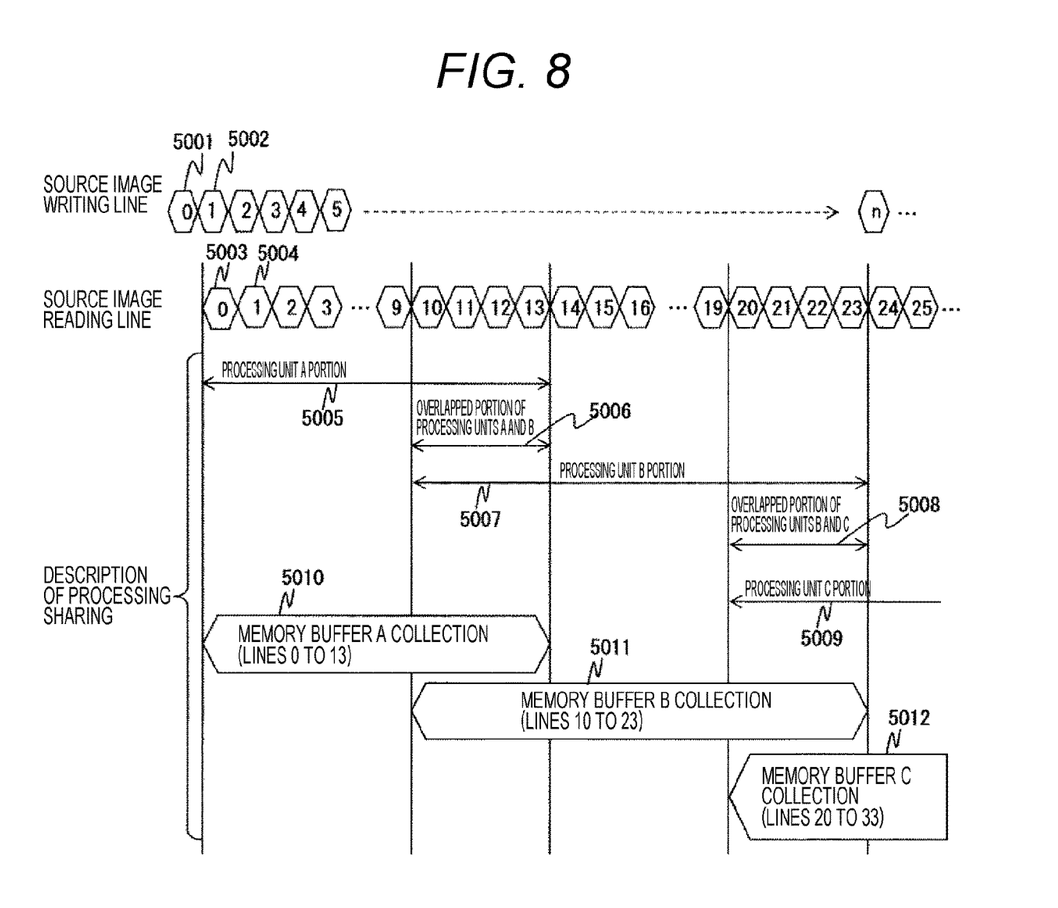
FIG. 8 is a diagram illustrating an example of a time chart of access of the image memory and data distribution to the processing unit.

FIG. 8 is a time chart illustrating an access of the image memory 50 and a timing of processing of each processing unit. Originally, both the source image right 220 and the source image left 210 are accessed, but here, the source image right 220 is described. First, the image photographed by the photographing unit 20 is written at a timing indicated by a source image writing line.

Data 5001 is a first line 0 (the highest raster of the image) written by the photographing unit 20, data 5002 is a line 1, and continuous raster data is written in the same manner thereafter. On the other hand, the memory access management 40 reads a first line of the source image right 220 in data 5003, and then reads the data line by line in the order of the data 5004. In a period 5005, the processing unit A 30 receives the data. In a period 5006, the processing unit A 30 and the processing unit B 31 receive the data redundantly.

In a period 5007, the processing unit B 31 receives the data. In a period 5008, the processing unit B 31 and the processing unit C 32 receive the data redundantly. In a period 5009, a processing C 32 receives the data. A period 5010 indicates a period during which the data read by the memory access management 40 is collected in the memory buffer A 301 of the processing unit A 30. That is, the processing management A 300 of the processing unit A 30 collects data from a line 0 to a line 13 output to the internal data bus 82 in the memory buffer A 301.

In other words, the processing unit A 30 (first processing unit) receives image data from the line 0 (a first line) to the line 13 (a second line). In addition, the processing unit A 30 corrects (affine-transforms) distortion of the received image data, as described with reference to FIG. 1.

A period 5011 indicates a period during which the data read by the memory access management 40 is collected in a memory buffer B 311 of the processing unit B 31. That is, the processing management B 310 of the processing unit B 31 collects data from a line 10 to a line 23 output to the internal data bus 82 in the memory buffer B 311.

In other words, the processing unit B 31 (a second processing unit) receives image data from the line 10 (a third line) located between the line 0 (the first line) and the line 13 (the second line) to the line 23 (a fourth line). Accordingly, the processing unit A 30 and the processing unit B 31 can perform parallel processing for the image data from the line 10 to the line 13. In addition, the processing unit B 31 corrects distortion of the received image data, as described with reference to FIG. 1.

A period 5012 indicates a period during which the data read by the memory access management 40 is collected in a memory buffer C 321 of the processing unit C 32. That is, the processing management C 320 of the processing unit C 32 collects data from a line 20 to a line 33 output to the internal data bus 82 in the memory buffer C 321.

In this drawing, the data of the source image right 220 is accessed once from the line 0 to the end. However, for example, in the overlapped period such as the period 5006, the memory buffer A 301 and the memory buffer B 311 simultaneously collect the same data on the internal data bus 82 so that each processing unit (for example, the processing unit A and the processing unit B) can receive the data.

In other words, the amount of data read from the image memory 50 (the first memory) by the memory access management 40 (the memory access management unit) is smaller than a total sum of the amount of data processed by the plurality of processing units (the processing unit A 30, the processing unit B 31, and the processing unit C 32), respectively.

Therefore, overlapped access to data is removed to prevent an increase of the bus traffic.

The processing unit A 30 starts affine transformation processing at the time when data corresponding to one block line is collected in the memory buffer A 301. The same applies to the processing unit B 31 and the processing unit C 32.

Figure 13:
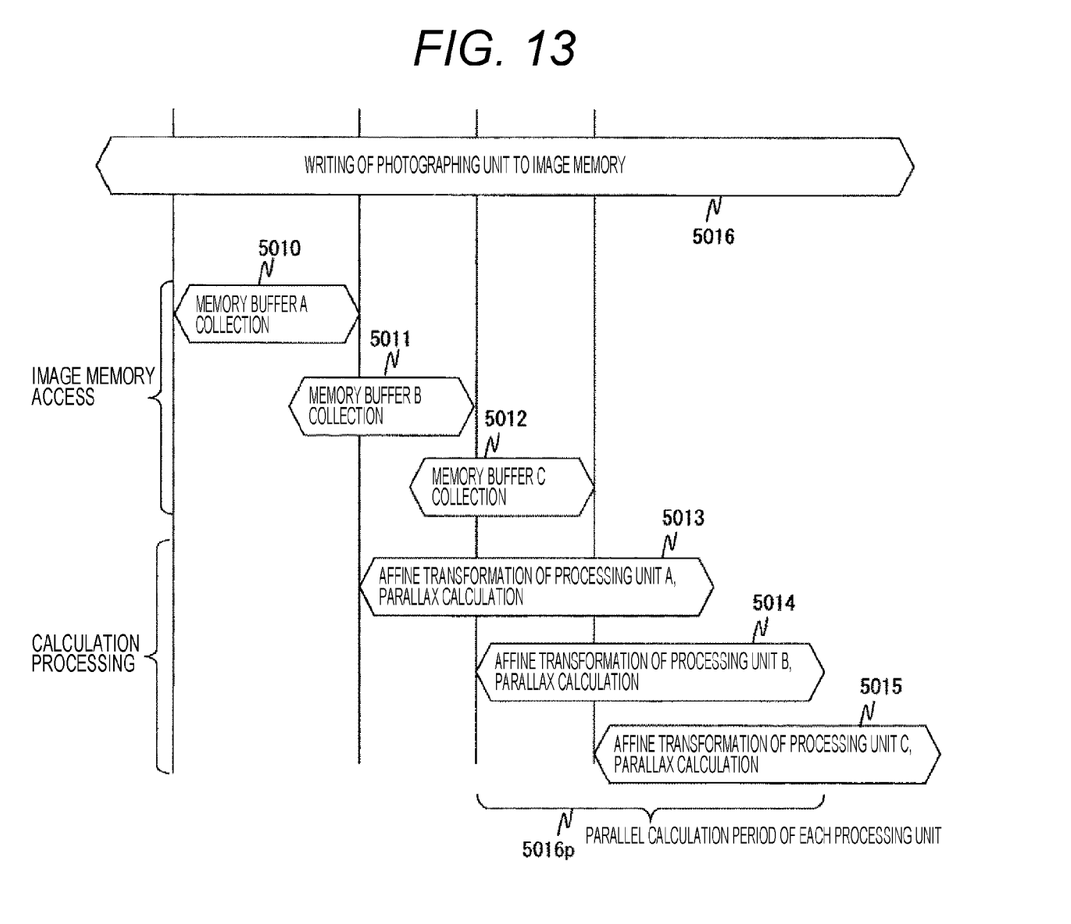
FIG. 13 is a diagram illustrating an example of an operation of a memory buffer and a processing period of calculation processing.

FIG. 13 illustrates an example of an operation of the memory buffer and a processing period of calculation processing. Since the processing time of the affine transformation processing and the parallax calculation processing, that is, the periods of 5013, 5014, and 5015 are sufficiently late than a time in which the memory access management 40 reads the image memory 50 line by line and the data is stored in the memory buffer, that is, a period of the sum of 5010, 5011, and 5012, there is a period 5016p in which the affine transformation and parallax calculation processing of the processing unit A 30 to the processing unit C 32 are processed in parallel. In addition, since a period 5016 in which the image photographed by the photographing unit 20 is written in the image memory 50, and a memory read of the memory access management 40 can also be processed in parallel, the system can be speeded up.

Figure 9:
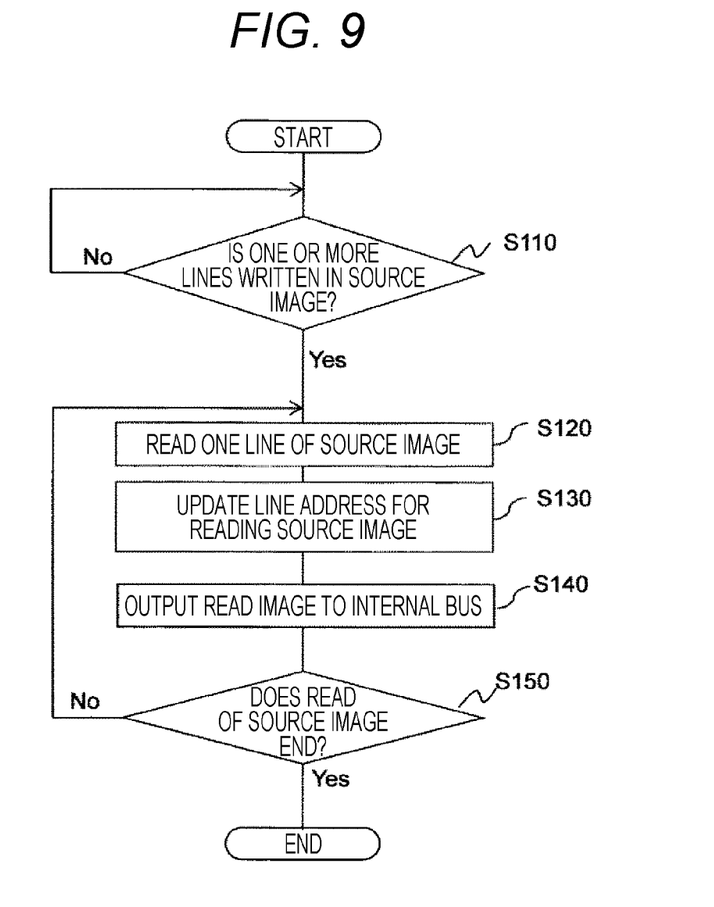
FIG. 9 is a processing flow of a memory access management.

FIG. 9 illustrates a processing flow of the memory access management 40. It is determined whether or not the photographing unit 20 writes one or more lines of data in the source image right 220 or the source image left 210 and waits for the processing until one or more lines of data have been written (S110). If one or more lines of data are written, the data is read from the source image right 220 (or the source image left 210) (S120).

If one line of access is completed, an address is updated for the next access (S130). The read data is output to the internal bus 80 (S140). The processing is repeated until the last line of the source image right 220 (or the source image left 210) is read (S150). As described above, the memory access management 40 reads the source image right 220 (or the source image left 210) without repeating the access to the same line.

In other words, the memory access management 40 (the memory access management unit) detects that one or more lines of image data are written in the image memory 50 (the first memory). When it is detected that one or more lines of image data are written in the image memory 50, the memory access management 40 reads the image data line by line from the image memory 50 via the memory bus 70 (the first bus) and outputs the read image data to the internal bus 80 (the second bus).

Figure 10:
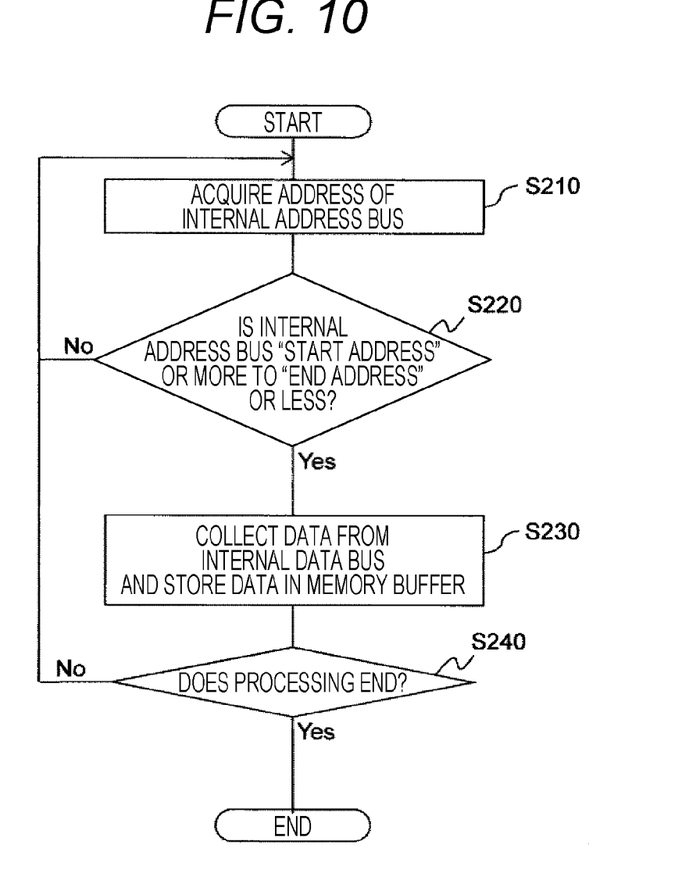
FIG. 10 is a block diagram of a processing management.

FIG. 10 illustrates an operation flow of the processing management A 300. An address sent from the memory access management 40 to the internal address bus 81 is acquired (S210). It is determined whether the acquired address is the start address 3001 or more and is the end address 3003 or less (S220). If the condition is satisfied, the data is collected from the internal data bus 82 when the condition is satisfied and is stored in the memory buffer A 301. Thereafter, the processing is repeated until the defined processing ends (S240).

This processing is performed for the processing management B 310 and the processing management C 320 in the same way, and it is independently determined whether or not the data is received from the internal bus 80 by an address comparison by the start address 3001 and the end address 3003 which are respectively set. Therefore, if the condition is simultaneously satisfied in the plurality of processing units, the data can be simultaneously collected.

According to the first embodiment described above, since the memory access management 40 can prevent the overlapped access of the image memory 50 to the overlapped region commonly used by the plurality of processing units, an increase of the traffic of the memory bus 70 can be prevented.

That is, the image data can be processed at a high speed while suppressing the bus traffic.

Second Embodiment

Figure 11:
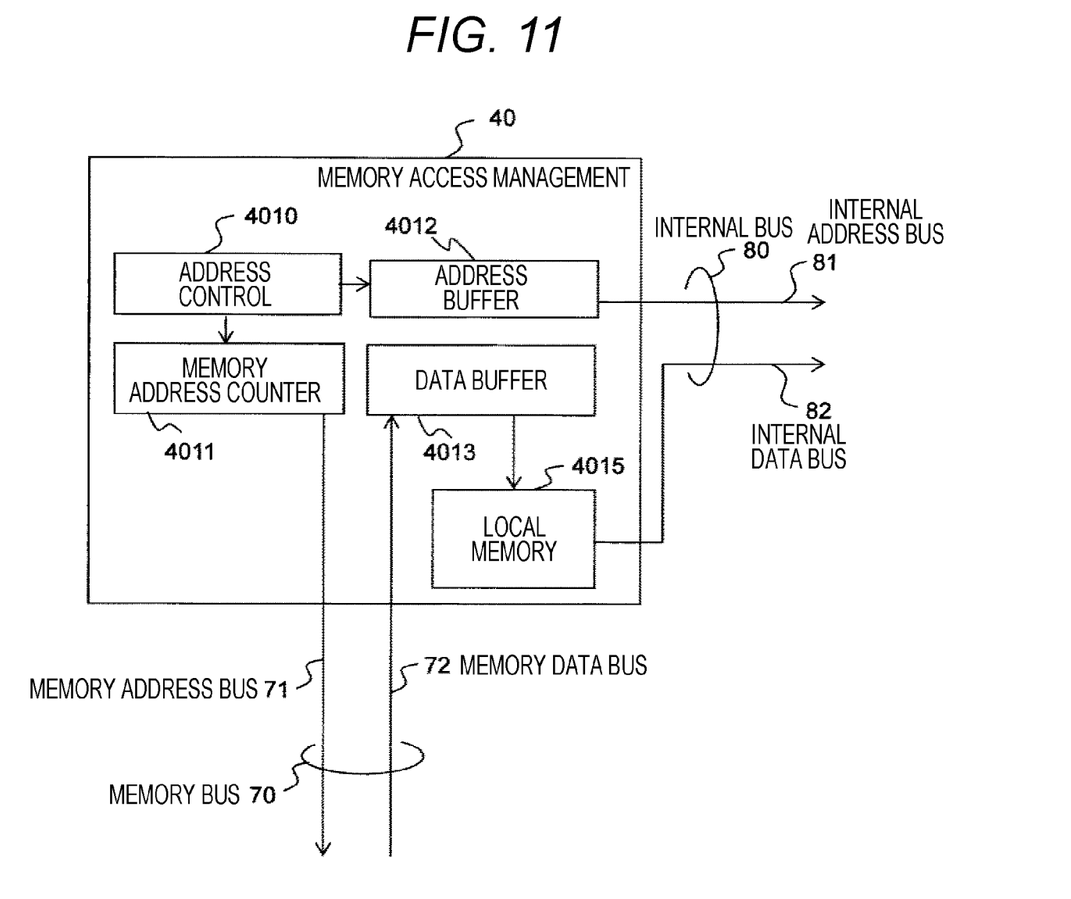
FIG. 11 is a block diagram of a second embodiment in which a local memory is installed on the memory access management.

Next, an operation when the memory access management 40 has a local memory 4015 (second memory) will be described as a second embodiment with reference to FIG. 11. It is assumed that the local memory 4015 has a capacity equal to or greater than the overlapped line 2203 illustrated in FIG. 3. Accordingly, a timing of data distribution to each processing unit can be adjusted.

Each processing unit writes the parallax image of the parallax calculation result in the image memory 50 via the memory bus 70. For this reason, there is a possibility that the writing of the parallax image may be waited depending on an operation state of the memory bus 70. Therefore, an operable timing of each processing unit is deviated. In FIG. 8, although the plurality of processing units simultaneously receive the data from the memory access management 40, there is a possibility that the simultaneous reception becomes impossible due to a deviation of the operation timing of each processing unit. Therefore, the overlapped line is stored in the local memory 4015, and the data is transmitted individually to each processing unit.

Figure 12:
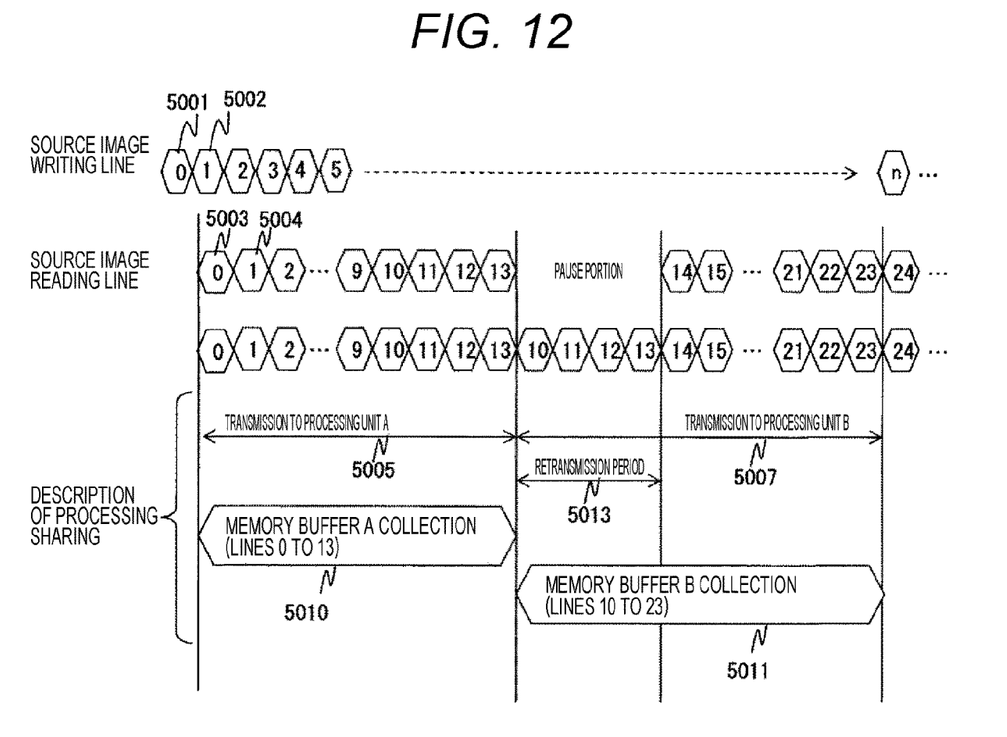
FIG. 12 is a diagram illustrating an example of an operation time chart of FIG. 11.

FIG. 12 illustrates an operation time chart of the second embodiment. A difference from FIG. 8 is that there is a retransmission period 5013. In the period 5010, after the line 0 to line 13 of the data 5003 are transmitted to the memory buffer A 301, the memory access management 40 temporarily idles the access of the source image right 220. This assumes a case in which the operation of the processing unit B 31 becomes a little slower than that in FIG. 8, and the processing unit B 31 cannot receive the overlapped portion with the processing unit A 30 at the same time. The memory access management 40 transmits the data of the line 10 again to the internal bus 80 (local bus) in the retransmission period 5013 and sends it to the processing unit B 31.

In other words, when the processing unit A 30 (first processing unit) can receive the image data and the processing unit B 31 (second processing unit) cannot receive the image data, the memory access management 40 (memory access management unit) stores the image data from the line 10 (the third line) to the line 13 (the second line) in the local memory 4015 (the second memory) and stops reading of the image data after a line 14 next to the line 13. Subsequently, when the processing unit B 31 may receive the image data, the memory access management 40 outputs the image data from the line 10 to the line 13 stored in the local memory 4015 to the internal bus 80 (the second bus).

According to the second embodiment described above, by having the local memory 4015, even if the operation timing of each processing unit is deviated, the overlapped access of the image memory 50 can be prevented.

Note that the present invention is not limited to the embodiments described above, but includes various variations. For example, the embodiments described above have been described in detail in order to explain the present invention in detail, and are not necessarily limited to those having all the configurations described above. In addition, it is possible to replace some of the configurations of any embodiment with those of other embodiments, and it is also possible to add the constitution of another embodiment to the constitution of any embodiment. In addition, it is possible to add, delete, and replace other configurations for some of the configurations of each embodiment.

In the above embodiment, the photographing unit 20 (a capturing unit) is constituted by the two cameras, but the number of cameras constituting the photographing unit 20 is arbitrary. When the photographing unit 20 is constituted by a single camera, the parallax calculation is not possible, but the affine transformation processing can be performed at a high speed by applying the present invention to correct the distortion of the image data.

Figure 14:
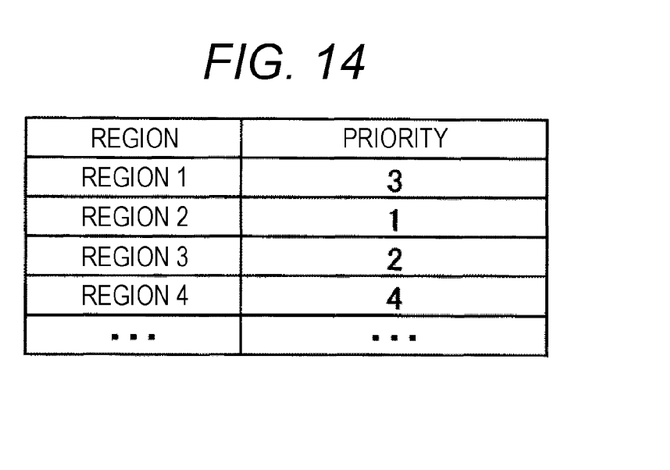
FIG. 14 is a diagram illustrating a correspondence relationship between a region of image data and priority.

The memory access management 40 (memory access management unit) may read image data of an image data region according to priority corresponding to the image data region, and may output the read image data of the region to the internal bus 80 (the second bus). Accordingly, the image data of a region having high priority is first distributed and is processed by a processing unit responsible for the region. The region and priority of the image data are stored correspondingly to a predetermined memory (storage device), for example, as illustrated in FIG. 14.

In addition, the embodiments of the present invention may have the following aspects.

(1) A camera device including: an image memory storing image data; a plurality of processing units disposed in parallel to the image memory to process the image data; and a memory access management unit reading the image data from the image memory and distributing the image data to the plurality of processing units.

(2) The camera device according to (1), wherein the memory access management unit simultaneously distributes the image data.

(3) The camera device according to (1), wherein the processing region of each processing unit is set to be partially overlapped with the processing region of another processing unit.

(4) The camera device according to (1), wherein the amount of data read from the image memory by the memory access management unit is smaller than the total sum of the amount of data necessary for the plurality of processing units.

According to the above embodiments (1) to (4), the memory access management unit representatively reads the image data commonly used by the plurality of processing units from the image memory. Since the common image data is distributed to each processing unit as needed by the memory access management unit, an increase in bus traffic of the image memory can be suppressed even if the processing unit is increased. For this reason, it is possible to perform high-speed processing in accordance with the degree of parallelism of the processing unit.

REFERENCE SIGNS LIST

10 stereo camera device
20 photographing unit
21 left camera
22 right camera 30 processing unit A
31 processing unit B
32 processing unit C
40 memory access management
50 image memory
60 CPU
70 memory bus
80 internal bus
90 SoC
210 source image left
220 source image right
300 processing management A
301 memory buffer A
302 affine transformation A
303 parallax calculation A
310 processing management B
311 memory buffer B
312 affine transformation B
313 parallax calculation B
320 processing management C
321 memory buffer C
322 affine transformation C
323 parallax calculation C
4015 local memory

The invention claimed is:

1. A camera device comprising:
   at least one camera configured to photograph an image and generate image data of the image;
   a first bus coupled to the at least one camera;
   a first memory coupled to the first bus to store the image data;
   a second bus;
   a second memory;
   a memory access management controller coupled to the first bus and including a data buffer coupled to the second bus; and
   a plurality of processors coupled to the second bus and configured to receive and process the image data output to the second bus from the data buffer,
   wherein each respective processor of the plurality of processors is configured to detect an execution state of the respective processor and transmit the execution state via control signal to the memory access management controller, the plurality of processors comprising:
      at least a first processor configured to receive the image data from a first line to a second line,
      at least a second processor configured to receive the image data from a third line, located between the first line and the second line, to a fourth line; and
   wherein the memory access management controller is configured to:
      read the image data from the first memory via the first bus and output the read image data to the data buffer,
      responsive to determining that the first processor receives the image data based on the execution state received via control signal, store the image data from the third line to the second line in the second memory and stop reading of the image data after a line next to the second line, and
      responsive to determining that the second processor receives the image data based on the execution state received via control signal, output the image data from the third line to the second line stored in the second memory to the second bus.

2. The camera device according to claim 1, wherein the memory access management controller is configured to read the image data line by line, and to output the read image data to the second bus via the data buffer line by line.

3. The camera device according to claim 2, wherein
   the first processor is configured to correct distortion of the image data from the first line to the second line, and
   the second processor is configured to correct distortion of the image data from the third line to the fourth line.

4. The camera device according to claim 1, wherein an amount of data read from the first memory by the memory access controller is smaller than a total sum of an amount of data processed by each of the plurality of processors.

5. The camera device according to claim 1, wherein each of the plurality of processors is configured to process the image data of different regions,
   the respective regions have a portion overlapped with other regions, and
   the memory access controller is configured to read the image data of the region according to priority corresponding to the region, and output the read image data of the region to the second bus.

6. A camera device comprising:
   at least one camera configured to photograph an image and generate image data of the image;
   a first bus coupled to the at least one camera;
   a first memory coupled to the first bus to store the image data;
   a second bus;
   a second memory;
   a memory access management controller coupled to the first bus and including a data buffer coupled to the second bus; and
   a plurality of processors coupled to the second bus and configured to receive and process the image data output to the second bus from the data buffer, the plurality of processors comprising:
      at least a first processor configured to receive the image data from a first line to a second line, and correct distortion of the received image data, and
      at least a second processor configured to receive the image data from a third line, located between the first line and the second line, to a fourth line, and correct distortion of the received image data;
   wherein the memory access management controller is configured to:
      read the image data from the first memory line by line via the first bus and to output the read image data to the second bus via the data buffer line by line,
      store the image data from the third line to the second line in the second memory and stop reading of the image data after a line next to the second line responsive to determining that the first processor receives the image data and the second processor does not receive the image data, and
      output the image data from the third line to the second line stored in the second memory to the second bus responsive to determining that the second processor receives the image data.

* * * * *